(12) United States Patent
Akin et al.

(10) Patent No.: US 11,860,115 B2
(45) Date of Patent: Jan. 2, 2024

(54) MEASUREMENT MECHANISM

(71) Applicant: TUSAS—TURK HAVACILIK VE UZAY SANAYII ANONIM SIRKETI, Ankara (TR)

(72) Inventors: Deger Akin, Kazan/Ankara (TR); Dilek Kumlutas, Bornova/Izmir (TR); Furkan Kulak, Kazan/Ankara (TR)

(73) Assignee: TUSAS—TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 258 days.

(21) Appl. No.: 17/417,906

(22) PCT Filed: Dec. 20, 2019

(86) PCT No.: PCT/TR2019/051139
§ 371 (c)(1),
(2) Date: Jun. 24, 2021

(87) PCT Pub. No.: WO2020/139273
PCT Pub. Date: Jul. 2, 2020

(65) Prior Publication Data
US 2022/0074879 A1   Mar. 10, 2022

(30) Foreign Application Priority Data
Dec. 28, 2018   (TR) ................................ 2018/21041

(51) Int. Cl.
*G01N 25/48* (2006.01)

(52) U.S. Cl.
CPC ..... *G01N 25/4813* (2013.01); *G01N 25/4853* (2013.01)

(58) Field of Classification Search
CPC .......................... G01K 25/4853; G01K 25/18
See application file for complete search history.

(56) References Cited

U.S. PATENT DOCUMENTS

| | | | |
|---|---|---|---|
| 6,487,866 B1 | 12/2002 | Fesmire et al. | |
| 2022/0099605 A1* | 3/2022 | Akin | G01N 25/18 |

FOREIGN PATENT DOCUMENTS

| | | | |
|---|---|---|---|
| CN | 102645449 A | | 8/2012 |
| CN | 107300570 A | * | 10/2017 |

(Continued)

OTHER PUBLICATIONS

Warzoha Ronald J et al: "High resolution steady-state measurements of thermal contact resistance across thermal interface material junctions", Review of Scientific Instruments, vol. 88, Article No. 094901, Sep. 19, 2017, pp. 1-9.

(Continued)

*Primary Examiner* — Mirellys Jagan
(74) *Attorney, Agent, or Firm* — Notaro, Michalos & Zaccaria P.C.

(57) ABSTRACT

A measurement mechanism that has a body, a vacuum chamber located on the body and in which a measurement process is performed is disclosed. A first sample and a second sample between which a heat transfer occurs are placed in the vacuum chamber and contact each other. A piston that provides the first sample and the second sample to continuously contact each other, a measurement unit that contacts the first sample and the second sample, and a cooler located below the first sample and the second sample is also disclosed.

6 Claims, 2 Drawing Sheets

(56) References Cited

FOREIGN PATENT DOCUMENTS

| CN | 107782762 | A | | 3/2018 | | |
|----|-----------|---|---|--------|---|---|
| CN | 207764148 | U | | 8/2018 | | |
| CN | 109001252 | A | * | 12/2018 | | |
| CN | 112129810 | A | * | 12/2020 | ............. | G01N 25/20 |
| CN | 112229871 | A | * | 1/2021 | ............. | G01N 25/20 |

OTHER PUBLICATIONS

Koichi Nishino et al: "Thermal contact conductance under low applied load in a vacuum environment", Experimental Thermal and Fluid Science, vol. 10, Feb. 1, 1995, pp. 258-271.
TH Mcwaid: "Thermal Contact Resistance Across Pressed Metal Contacts in a Vacuum Environment", PhD dissertation, Sep. 30, 1990, pp. 134-157.
International Search Report for corresponding PCT application No. PCT/TR2019/051139, dated May 6, 2020.
Written Opinion of the International Prelimininary Examining Authority and Response for corresponding PCT application No. PCT/TR2019/051139, dated Jul. 29, 2020.
Second Written Opinion of the International Prelimininary Examining Authority and Response for corresponding PCT application No. PCT/TR2019/051139, dated Oct. 6, 2020.
International Preliminary Report on Patentability for corresponding PCT application No. PCT/TR2019/051139, completed Dec. 3, 2020.

* cited by examiner

MEASUREMENT MECHANISM

FIELD

The present invention relates to a measurement mechanism which provides measuring thermal contact resistance.

BACKGROUND

Especially in space and air vehicles, honeycomb sandwich panels having carbon fibre-reinforced plate surfaces are commonly used. While various equipment and components provided in space vehicles may be fixed directly to such panels, the fixing process is performed by means of supports. Equipment, components and/or supports which are fixed to these panels may be made of metallic materials. For that reason, precise determination of thermal contact resistance, which is generated as a result of fixing the equipment, components and/or supports to the panels, is a significant factor for thermal control design of the space vehicle. While measuring the thermal contact resistance, it is provided that at least two samples contact each other. A heat transfer occurs between two samples. Meanwhile, the thermal contact resistance is measured by performing a measurement. Said test is executed in an environment without air interaction. A pressure allows two samples to be in a continuous contact with each other. The continuous pressure is provided by means of a high power piston. However, air flow occurring around the piston during its movement weakens power of the piston.

Chinese patent application no. CN102645449 covered by the known art discloses a test mechanism in which the power transmission is provided by means of a screw.

In another published document having the title of "High resolution steady-state measurements of thermal contact resistance across thermal interface material junctions", (WARZOHA RONALD J ET AL: REVIEW OF SCIENTIFIC INSTRUMENTS, vol. 88, article number 094901, 19 Sep. 2017, pages 1-9) an infrared thermography-based steady-state heat meter bar apparatus with a novel in situ thickness measurement system having 0.5 nm sensitivity is disclosed. These in situ thickness measurements allows simultaneously determine RT (the interfacial thermal resistance) and RC (thermal contact resistance) independently. The work discussed with this document focuses on need for appropriate metrology and independent measurements of RC and RT to better optimize thermal interface materials for a number of important electronics applications. The thermal resistance across the interface can be calculated with knowledge of both the heat flux at the interface, as well as the temperature difference across the interface, and the area of the interface itself. To determine the heat flux across the interface, a set of slender, rectangular bars with well-known thermal conductivity surround the interstitial material and form the primary interfaces of interest. The measurements can be performed in a vacuum chamber. In the chamber, heaters, cooler, heat meter bars, load cells and a piston are provided. The interfaces are aligned using an x-y translation stage with <1 μm sensitivity in addition to a gimbal stage to allow for rotation. Alignment is achieved by evenly distributing the applied force from the piston at the top of the heat meter bars across a series of 3 load cells separated by 180° under the bottom heat meter bar.

In the other published document having the title of "Thermal contact conductance under low applied load in a vacuum environment" (KOICHI NISHINO ET AL: EXPERIMENTAL THERMAL AND FLUID SCIENCE, vol. 10, 1 Feb. 1995, pages 258-271), measurement of thermal contact conductance of test plates in a vacuum environment under low applied load is disclosed. During measurement, heat transfer is formed through the test plates that are contacting each other by heating from one side and cooling from the other side and a low pressure is applied by the bolts provided on the corners of the test chamber. During test, a pressure-measuring film that is capable of visualizing contact pressure distributions is used for predicting thermal contact conductance. Therefore, more accurate measurement results can be obtained although nonuniformities (such as different shapes of test plates) are present.

However, none of these documents provides a solution for weakening of the power of the piston due to air flow occurring around the piston during its movement.

SUMMARY

An object of the present invention is to achieve a measurement mechanism which provides increase in movement efficiency.

The measurement mechanism aimed to achieve the object of the present invention and disclosed in the claims comprises a body, and a vacuum chamber which is located on the body. The vacuum chamber comprises therein a first sample and a second sample between which a heat transfer occurs; a piston which exerts a continuous pushing force in order for the first sample and the second sample to contact each other; a measurement unit which is located between the first sample and the second sample and provides measuring the heat transfer between the first sample and the second sample; and a cooler which is located below the first sample and the second sample.

In the measurement mechanism, which is the subject matter of the present invention, the piston is fixed on the vacuum chamber by means of a connection element. A plurality of air ducts is located on the connection element. Thanks to the air ducts, pressure of the piston is directly transmitted onto the first sample and the second sample.

In an embodiment of the invention, the connection element has a conical form. Thus, mounting the connection element onto the vacuum chamber is facilitated.

In an embodiment of the invention, the connection element comprises a central circle and a circumscribing circle having a diameter larger than that of the central circle. The air ducts are located between the central circle and the circumscribing circle. The piston moves inside the central circle.

In an embodiment of the invention, the connection element comprises a plurality of support walls which are located between the air ducts. Thanks to the support walls, it is provided that endurance of the connection element is increased.

In an embodiment of the invention, the connection element has support walls that comprise slope. Therefore, production of the connection element is facilitated and aerodynamic structure thereof is improved. The pressure is directly transmitted between the first sample and the second sample without hitting the support walls. Therefore, efficiency is increased.

In an embodiment of the invention, the connection element comprises connection elements which are located on the circumscribing circle. While the connection elements are detachable, a method such as welding, etc. may also be implemented. Location of the connection elements provides the piston to move in a horizontal axis without tottering.

In an embodiment of the invention, the connection element is made of a stainless steel material. Therefore, endurance is increased.

With the present invention, there is achieved a connection element through which the piston passes such that force of the piston can be transmitted onto the first sample and the second sample without decreasing.

BRIEF DESCRIPTION OF THE DRAWINGS

The measurement mechanism aimed to achieve the object of the present invention is illustrated in the attached figures, in which.

DETAILED DESCRIPTION

Figure 1:
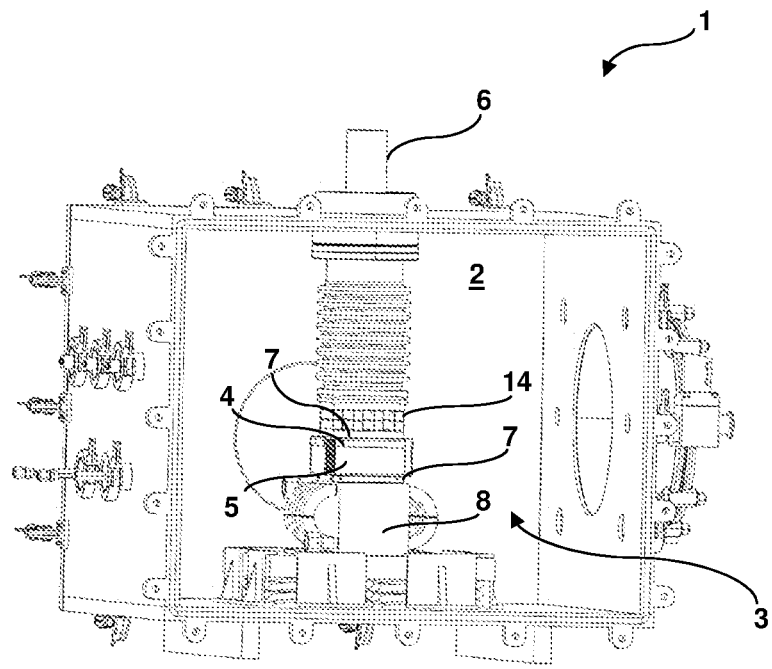
FIG. 1 is a perspective view of a measurement mechanism.
Figure 2:
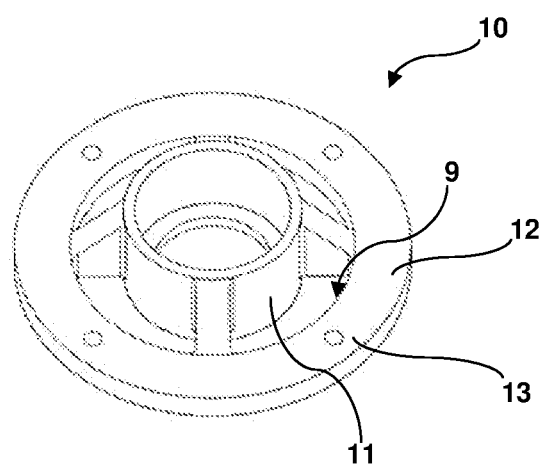
FIG. 2 is a perspective view of a connection element.
Figure 3:
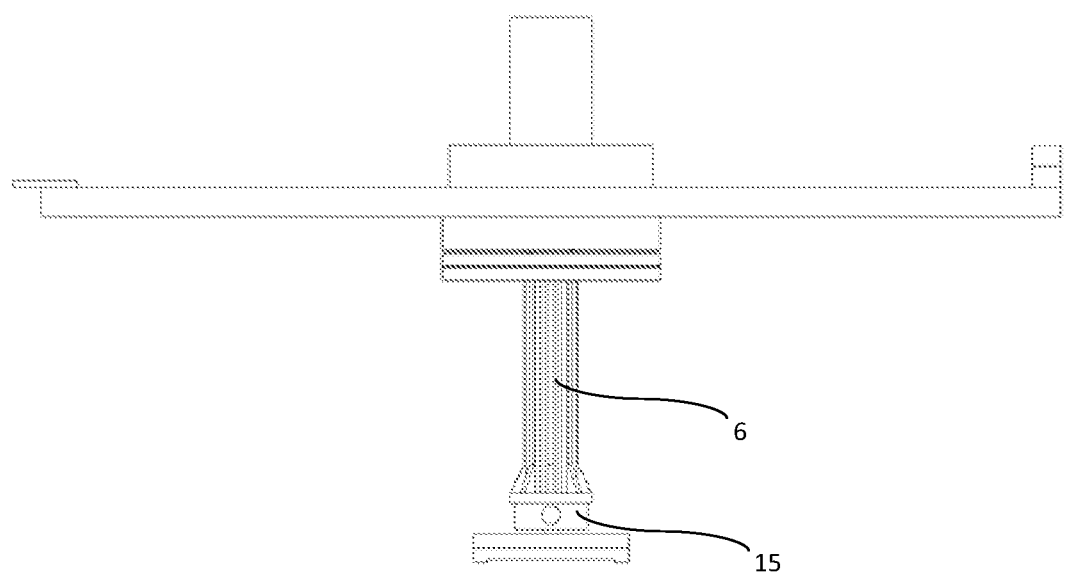
FIG. 3 is a frontal view of the piston.

All the parts illustrated in figures are individually assigned a reference numeral and the corresponding terms of these numbers are listed below.

1—Measurement mechanism
2—Body
3—Vacuum chamber
4—First sample
5—Second sample
6—Piston
7—Measurement unit
8—Cooler
9—Air duct
10—Connection element
11—Central circle
12—Circumscribing circle
13—Connection point
14—Heater
15—pressure gauge The measurement mechanism (1) comprises a body (2); a vacuum chamber (3) which is located on the body (2) and in which a measurement process is performed; a first sample (4) and a second sample (5) between which a heat transfer occurs, which are placed in the vacuum chamber (3) and contact each other; a piston (6) which provides the first sample (4) and the second sample (5) to continuously contact each other; a heater (14) located above the first sample; a measurement unit (7) which contacts the first sample (4) and the second sample (5); and a cooler (8) located below the first sample (4) and the second sample (5). Thanks to the piston (6), the first sample (4) and the second sample (5) continuously contact each other. Therefore, it is provided that the measurement unit (7) is able to measure thermal contact resistances of the first sample (4) and the second sample (5). By performing the measurement process in the vacuum chamber (3), external environment factors do not affect the measurement results. Thus, more accurate measurement results are provided.

The measurement mechanism (1), which is the subject matter of the present invention, comprises a piston (6) which provides transmitting the pressure directly onto the first sample (4) and the second sample (5) due to a connection element (10) that comprises thereon a plurality of air ducts (9). Thanks to the connection element (10), the piston (6) is centred on the vacuum chamber (3) and provides power transmission. Due to the air ducts, force of the piston (6) proceeds through the connection element (10) without decreasing.

In an embodiment of the invention, the measurement mechanism (1) comprises a connection element (10) which has a conical form. Thus, aerodynamics of the piston (6) is provided. Material to be used is reduced, thereby providing ease-of-production.

In an embodiment of the invention, the measurement mechanism (1) comprises a connection element (10) comprising a central circle (11) through which the piston (6) passes, a circumscribing circle (12) which encircles the central circle (11), and air ducts which are located between the central circle (11) and the circumscribing circle (12). The air ducts are located between the central circle (11) and the circumscribing circle (12). The central circle (11) and the circumscribing circle (12) provide increasing the endurance of the connection element (10).

In an embodiment of the invention, the measurement mechanism (1) comprises a connection element (10) comprising support walls which are located between the air ducts. Thanks to the support walls, it is provided that endurance of the connection element (10) is increased. The connection element (10) makes high piston (6) powers balanced, thereby providing the piston (6) to be centred.

In an embodiment of the invention, the measurement mechanism (1) comprises support walls comprising a slope from the central circle (11) towards the circumscribing circle (12). Due to the fact that the support walls comprise slope, pressure transmitted by the piston (6) through the connection element (10) proceeds by sliding along the support walls. Therefore, movement of the piston (6) is facilitated.

In an embodiment of the invention, the measurement mechanism (1) comprises a plurality of connection points (13) which are located on the circumscribing circle (12) and provide fixing the connection element (10) onto the vacuum chamber (3). The connection element (10) is fixed onto the vacuum chamber (3) by means of the connection points. The connection points may be removable or irremovable connections.

In an embodiment of the invention, the measurement mechanism (1) comprises a connection element (10) which is made of a stainless steel material. Thus, mechanical strength of the connection element (10) is increased. An increase in the quality perception of the user is provided.

In an embodiment of the invention, the measurement mechanism (1) comprises a pressure gauge (15) which is located on the piston (6) and provides measuring a pressure applied by the piston (6). Therefore, the pressure applied by the piston (6) onto the samples is able to be measured, and a more accurate measurement result is obtained.

With the present invention, there is achieved a measurement mechanism (1) having a connection element (10) which provides centring the piston (6) by balancing the power transmitted onto the vacuum chamber (3). Therefore, it is provided that the power transmitted by the piston (6) is transmitted directly onto the samples. The efficiency is increased.

The invention claimed is:

1. A measurement mechanism (1) comprising:
a vacuum chamber (3) in which a measurement process is performed;
a first sample (4) and a second sample (5) between which a heat transfer occurs and which are placed in the vacuum chamber (3) and contact each other;
a piston (6) which provides the first sample (4) and the second sample to continuously contact each other;
a heater (14) located above the first sample;
a measurement unit (7) which contacts the first sample (4) and the second sample (5);

a cooler (8) located below the first sample (4) and the second sample (5); and a connection element (10) which comprises thereon a plurality of air ducts (9) and which ensures location of the piston (6) on the vacuum chamber when the piston (6) passes through the connection element (10) and transmits a pressure directly to the first sample (4) and the second sample (5), a central circle (11) through which the piston (6) passes, and a circumscribing circle (12) which encircles the central circle (11); wherein said air ducts (9) are located between the central circle (11) and the circumscribing circle (12).

2. The measurement mechanism (1) according to claim 1, wherein the connection element (10) has a conical form.

3. The measurement mechanism (1) according to claim 1, wherein the connection element (10) is made of a stainless steel material.

4. The measurement mechanism (1) according to claim 1, wherein the connection element (10) comprises support walls which are located between the air ducts.

5. The measurement mechanism (1) according to claim 4, wherein the support walls comprise a slope from the central circle (11) towards the circumscribing circle (12).

6. The measurement mechanism (1) according to claim 4, comprising a plurality of connection points (13) located on the circumscribing circle (12) for fixing the connection element (10) onto the vacuum chamber (3).

* * * * *